United States Patent [19]
Wesemann

[11] 3,877,208
[45] Apr. 15, 1975

[54] FRUIT HARVESTER

[76] Inventor: Fred A. Wesemann, 1815 Jolly St., Apopka, Fla. 32703

[22] Filed: May 23, 1974

[21] Appl. No.: 472,824

[52] U.S. Cl............................................. 56/328 R
[51] Int. Cl........................................... A01g 19/08
[58] Field of Search.......................... 56/328 R, 339

[56] References Cited
UNITED STATES PATENTS
3,205,644   9/1965   Gordinier........................... 56/328 R
3,483,687   12/1969  Tanner, Jr.......................... 56/328 R Primary Examiner—Louis G. Mancene
Assistant Examiner—J. N. Eskovitz
Attorney, Agent, or Firm—Cushman, Darby & Cushman

[57] ABSTRACT

Apparatus for harvesting fruit in quantity. A movable crane supports suspended plates, one plate supporting a plurality of harvesting tubes with releasable bottoms, and another plate movable with respect to the first plate for selectively releasing the bottoms of the harvesting tubes. Each tube is connected by pipes with swivel joints to the supporting plate, and has sloped top and bottom surfaces so that it will not be caught and hindered by limbs when moving through a tree. In operation, the whole assembly is placed over a tree, lowered into the tree, and raised, the tubes harvesting the fruit when raised. The harvested fruit may then be deposited in an adjacent receiving area.

15 Claims, 7 Drawing Figures

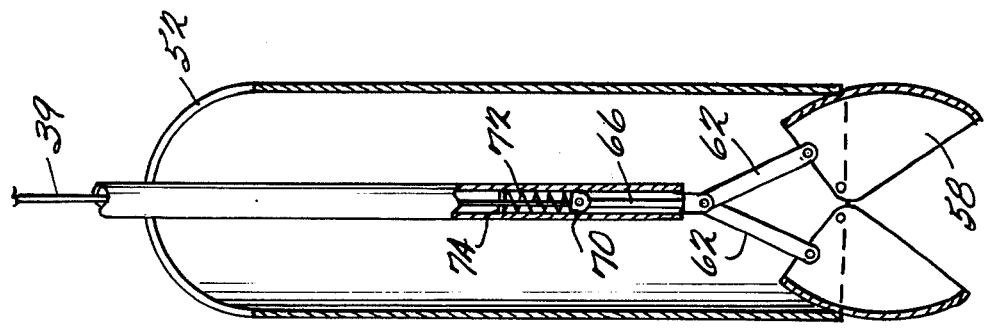
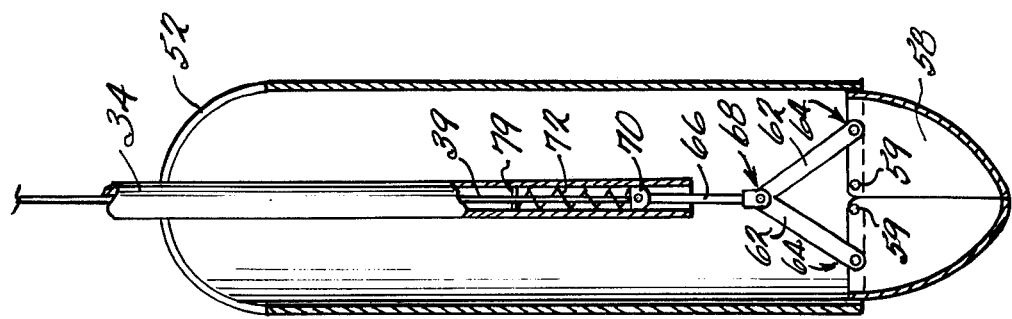
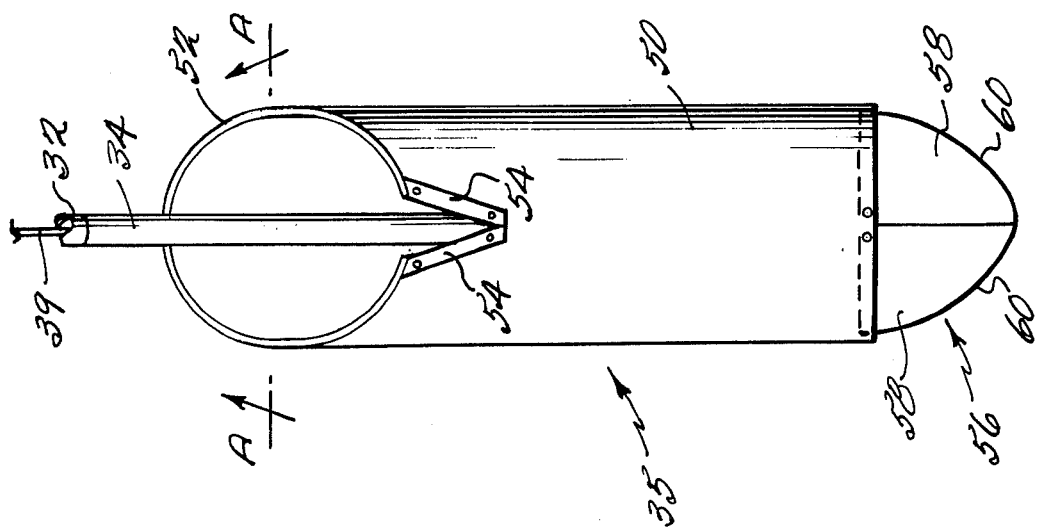

FRUIT HARVESTER

BACKGROUND AND SUMMARY OF THE INVENTION

The present invention relates to apparatus for quickly and efficiently harvesting large quantities of fruit from trees, and for depositing the fruit so harvested in a receiving area. In the past there have been numerous proposed devices for harvesting fruit on a large scale, such as shown in U.S. Pat. Nos. 3,205,644, 3,483,687 and 3,561,205. The apparatus of the present invention is an improvement over the prior art proposals. In harvesting and collecting fruit on a commercial scale, it is essential that the harvesting operation proceeds as quickly as possible, while yet not leaving a significant amount of fruit on the trees, requiring the harvesting of all the fruit from a tree at once.

According to the teachings of the present invention, apparatus is provided that can harvest all the fruit from a tree — upwards of 1000 pieces in the case of oranges — making two passes within 1½ minutes. The device of the invention includes a plurality of tubes — up to 1000 — each with the capacity to hold two or more pieces of fruit supported by a supporting plate so that all fruit in the path of movement of a tube will be collected by the tube. The supporting plate has pins on the top surface thereof that guide a second plate for selectively releasing fruit collected by the tubes from the tubes and both plates are adapted to be connected to cables which in turn are supported by a crane boom. Supporting the device in such a manner, it is possible to readily operate the apparatus according to the teachings of the present invention even on sloped terrain. The tubes and the means for connecting them to the supporting plate are constructed so that the tubes may pass limbs without resistance when lowered into a tree, and will not get hung up by tree limbs when being raised during collecting. The actuating means includes a second plate above the supporting plate and having cables extending therefrom through the pipes connecting the tubes to the supporting plate for releasing the bottom of the tubes after harvesting when they are moved above a truck or collecting bin. There are no exposed moving parts of the releasing means that will be damaged by tree limbs, will do damage to the trees, or will get hung up by the tree limbs.

It is the primary object of the present invention to provide improved fruit harvesting apparatus that will quickly and efficiently harvest the fruit from a tree.

It is a further object of the present invention to provide fruit harvesting apparatus that has very few moving parts, only a single crane boom supporting the apparatus and providing for rasing, lowering and depositing of fruit collected thereby thereof.

It is a still further object of the present invention to provide fruit harvesting apparatus that has improved tube assemblies for harvesting the fruit, each tube assembly adapted to hold more than one piece of fruit during a harvesting operation to allow harvesting of all fruit within the paths of said tube means, and selectively depositing the fruit in a central collection area.

These and other objects of the invention will become clear from the detailed description of the invention and from the appended claims.

BRIEF DESCRIPTION OF THE DRAWINGS

FIG. 4 is a front detail view of a harvesting tube according to the teachings of the present invention;

FIG. 5 is a cross-sectional view taken generally along lines A—A of FIG. 4 showing the tube bottom in its fruit holding position;

FIG. 6 is a cross-sectional view taken generally along lines A—A of FIG. 4 showing the tube bottom in its fruit releasing position.

DETAILED DESCRIPTION OF THE INVENTION

Figures 1, 2B:
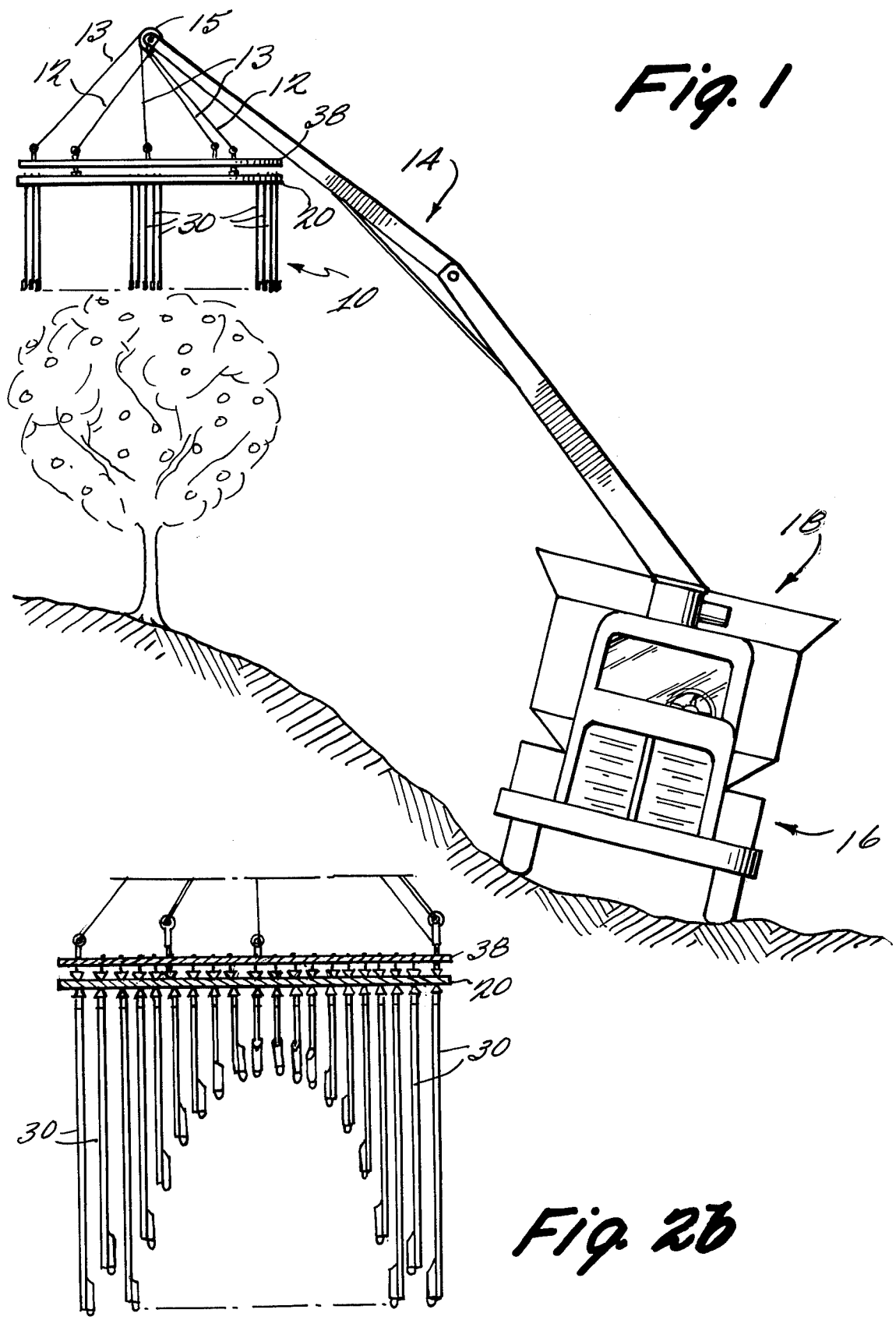
FIG. 1 is a diagrammatic view of apparatus according to the teachings of the present invention.
FIG. 2b is a cross-sectional view of the apparatus of FIG. 1 showing the harvesting tube assemblies arranged in a crown fashion.

Fruit harvesting apparatus according to the teachings of the present invention is shown generally at 10 in FIG. 1. The harvesting apparatus 10 is preferably connected by cables 12 and 13 to a boom 14 of a crane. The crane is mounted on a crane-truck 16. The truck 16 may also pull a trailer 18 into which fruit collected by the harvesting means 10 may be deposited.

Figure 2A:
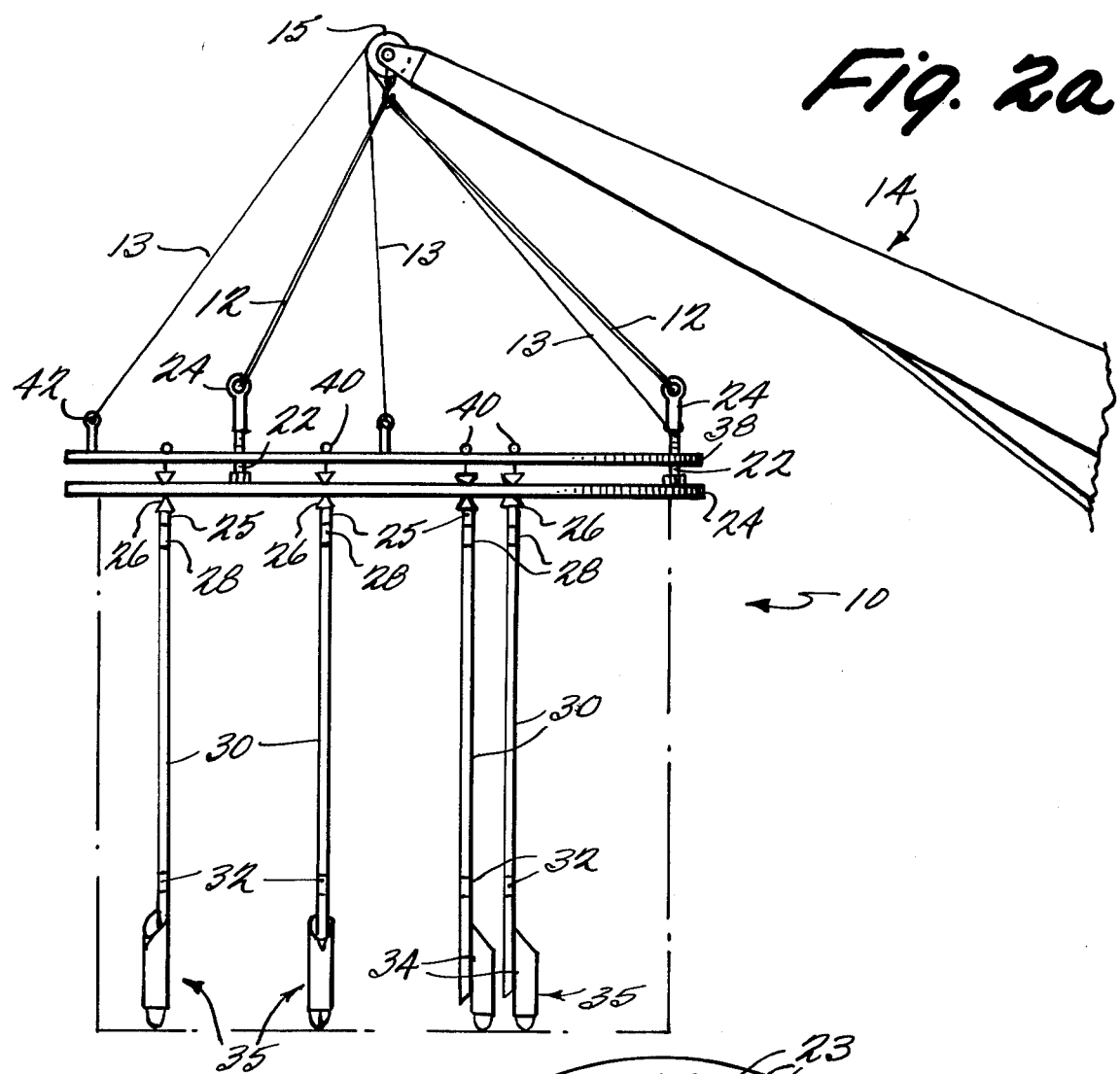
FIG. 2a is a detail side view of an exemplary form of the apparatus according to the teachings of the present invention only a few of the harvesting tubes assemblies being shown therewith.
Figure 3:
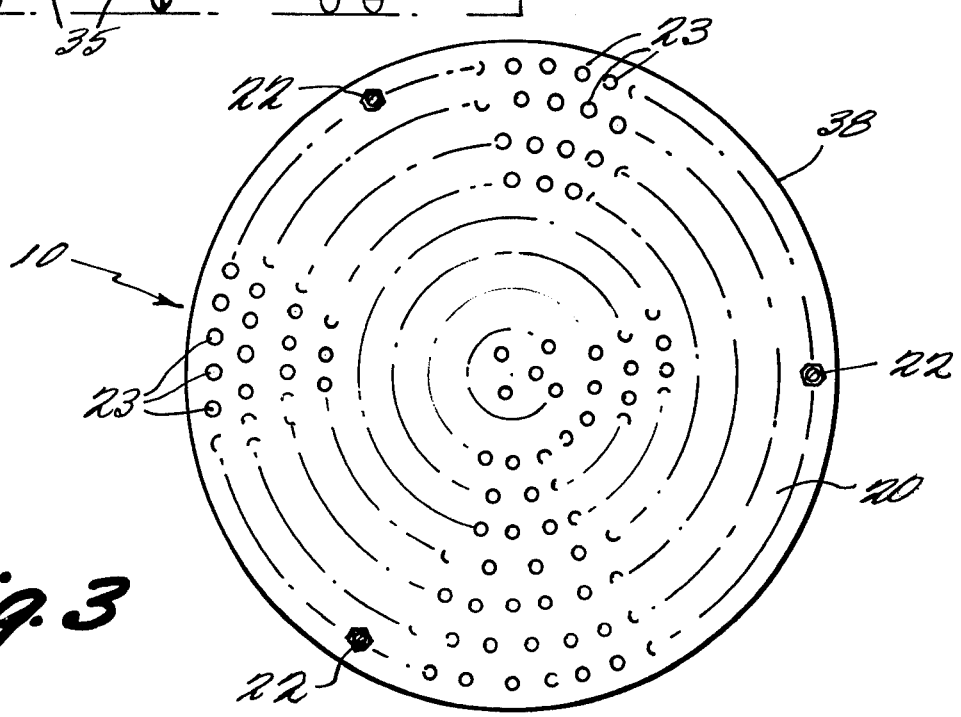
FIG. 3 is a fragmentary top plan view of a supporting plate according to the teachings of the present invention.

As shown most clearly in FIGS. 2 and 3, the harvesting means 10 comprises a supporting plate 20 having pins 22 mounted on the top surface thereof. A supporting member 24 is attached to each pin 22, and a cable 12 is attached to each member 24. Extending through the plate 20 are holes 23. Removably supported in each hole 23 is a hollow member 26 supporting a pipe section 25. The pipe section 25 is connected by swivel joint 28 to an elongated pipe 30. The pipe 30 may be made of aluminum or plastic or other light weight material. Each pipe 30 is connected by another swivel joint 32 to a pipe section 34 integral with a harvesting tube means, shown generally at 35. Note that the assemblies 35 may be staggered in height, and have clearance therebetween to more efficiently harvest the fruit and to allow easy passage between the limbs of the tree. Also, in a preferred form of the invention when the invention is to be used in a well-cared grove, the assemblies 35 may be arranged in a crown fashion [FIG. 2b] so that the rods in the interior of the apparatus 10 are shorter. This is because in a well-cared grove, the trees will have very little fruit in the interior thereof, but rather the fruit is located around the periphery of the tree.

Located vertically above and spaced from supporting plate 20 is a movable actuating plate 38. The plate 38 has apertures therein for receiving the pins 22 of plate 20 and the members 24 to guide the movement of plate 38 relative to plate 20. Attached to the upper surface of plate 38 are supporting members 42 which are adapted to be attached to cables 13. Extending through the plate 38 are a number of cables 39, one corresponding to each pipe 30. Each cable 39 extends from a fastening member 40 for fastening the cable to the plate 38 through a pipe 30 to an integral pipe section 34 of harvesting tube assembly 35. Although the cables 12 may be rigidly attached to the boom 14, the cables 13 are adapted to be connected to a pulley 15 or similar mechanism associated with the boom 14 for raising and lowering the actuating plate 38 with respect to the supporting plate 20. It will be seen that by supporting the harvesting assembly in such a manner that fruit may be harvested from trees that are on any grade, it not being necessary that the ground on one side of the tree be on the same level as the ground on the other side thereof, and that a number of trees may be harvested without moving the crane-truck by merely locating the truck originally so that several trees are within the range of movement of the boom 14.

The harvesting tube assembly 35 of the present invention is shown in detail in FIGS. 4 – 6. The assembly comprises a tubular body portion 50 having a sloped upper surface 52. Each tube 50 is preferably dimensioned so that its inside diameter is greater than that of the fruit being collected and long enough to hold at least two or three pieces of fruit. The slope of the upper surface 52 insures that as the assembly 35 is moved up through a tree it will not be "caught" on a limb, but instead will be cammed out of interference with the limb by swiveling about swivel joints 32 and 28. Located opposite the connecting pipe 34 is a cutout in the surface of the tube 50 having knife blades 54 therein. The V-arrangement of the knife blades is adapted to engage and sever stems attaching fruit received within the open end of tube 50.

A releasable bottom portion of the assembly 35 is shown generally at 56. The bottom portion 56 consists of two bottom members 58, each pivoted at 59 to the inside surface of the tube 50. The members 58 have a curved outside surface 60 to insure that as the assembly is lowered through a tree the tree limbs will not stop the motion thereof, but instead upon engaging a limb, the surface 60 will cause the assembly 35 to be cammed out of interference with the limb by swiveling about swivel joints 28 and 32, functioning in the same manner as the surface 52 does during assembly ascent.

Means for opening up the bottom of the assembly 35 by moving the members 58 is shown generally at 61 in FIGS. 5 and 6, and is actuated by cable 39. Each lever 62 is pivotally connected at one end 64 thereof to a member 58, and is pivotally connected to a rod 66 at the other end 68 thereof. The rod 66 is reciprocal within the pipe section 34, and is regidly connected, as by a pin 70, to the cable 39. In the normal position of the members 58, shown in FIG. 5, where the fruit collected by the assembly 35 is held within the tube 50, a spring 72 compressed between spring retaining plate 74 and the top portion of rod 66 biases the members 58 into their closed position. Upon movement of the plate 38 by the cables 13, each cable 39 will be moved upwardly relative to assembly 35, and will cause the bottom members 58 to be pivoted about their pivots 59 to the position shown in FIG. 6. In this position, fruit retained within the tube 50 will be allowed to fall through the bottom of the tube and into a desired collecting receptacle. It will be seen that the harvesting tube assembly of the present invention has no exposed moving parts, will not get caught on or damage limbs, and that each tube can effectively gather more than one piece of fruit and selectively release it.

OPERATION

To harvest fruit with the apparatus according to the teachings of the present invention, one drives the crane truck 16 mounting the assembly 10 between the rows of trees in a grove or orchard until it is conveniently located so that several trees are within range of boom 14. Then boom 14 is positioned directly over one of the trees, and the assembly 10 is lowered down into the tree until the tube assemblies 35 are below the bottom fruit-bearing portions of the tree. Should a tube 50 contact a tree limb, it will be cammed out of interference therewith by the sloped surfaces 60 of members 58. Then the boom 14 is moved upwardly toward its original position. As the assemblies 35 pass through the tree, blades 54 engage the stems of fruit received within the open upper end of tubes 50, and sever them, allowing the fruit to be collected within the tubes 50. Each tube 50 may receive several pieces of fruit should it engage them during its upward movement through the tree. Should a tube 50 engage a limb, surface 52 will insure that it will be cammed out of interference with the limb.

After the assembly 10 has been moved upwardly through the tree, the procedure may be repeated if it appears that a significant amount of fruit is still on the tree. After the final upward passage of the assembly 10, the boom 14 swings the whole assembly 10 over the trailer 18 pulled by the crane-truck 16. When conveniently positioned over the trailer, the cables 13 are acted upon by a pulley 15 on the boom 14, causing plate 38 to be moved vertically upwardly with respect to plate 20. Upward movement of plate 38 is guided by members 22 and 24. The upward movement of plate 38 also results in upward movement of the cables 39 attached rigidly thereto. Movement of each cable 39 results in upward movement of rod 66 against the bias of spring 72, and causes bottom members 58 to be pivoted apart about pivot points 59 to the position shown in FIG. 6. By thus opening the bottom of the tube assembly 35, the fruit collected by each tube 50 is allowed to fall into the trailer 18. After completing the harvesting of one tree, the boom 14 may be swung over another tree without moving the crane-truck 16, and the operation can be repeated until all trees within the range of the boom 14 have been harvested, whereupon the crane-truck can be moved into position for harvesting another set of trees.

Many modifications of the apparatus according to the teachings of the present invention are possible. For instance, the plates 20 and 38 need not be circular, but may be half-circles, quarter-circles, or any other shape depending upon the size of the trees to be harvested and the amount of weight that can be supported by the boom 14. In addition, as many pipes 30 and associated assemblies 35 may be attached to the plate 20 as desired, and replacement of any damaged assemblies can be quickly and easily effected in the field. Also, different means may be used for effecting operation of the bottom members of the harvesting tubes.

It is apparent that a harvesting apparatus has been disclosed that is operable for harvesting trees located on any terrain, that is relatively simple, easy and inexpensive to manufacture, that effectively can quickly and efficiently harvest fruit without having parts thereof caught on tree limbs and being damaged thereby or damaging the tree limbs, and that will collect all the fruit within the path of each harvesting assemblies, fulfilling all the objects of the present invention. Although the invention has been shown in what is presently conceived to be the most practical and preferred embodiment, the scope of the invention should not be limited to the details disclosed, but should include all equivalent structures and devices within the scope of the appended claims.

What I claim is:

1. Fruit harvesting apparatus comprising:
   a. a plurality of fruit harvesting tube assemblies, each of said assemblies including (i) a tubular body portion, (ii) an open top having a sloping surface, (iii) means for severing the stems of fruit received by said open top, and (iv) means for selectively either opening or closing the bottom of said tube, said means including members having sloped surfaces exterior of said tubular body portion,
   b. a supporting plate adapted to be operatively connected to a crane boom for lowering and raising said apparatus into and out of fruit-bearing trees,
   c. means for operatively connecting said plurality of tube assemblies to said supporting plate for allowing movement of said tubes out of interfering relationship with any tree limbs they might engage during lowering and raising said apparatus into and out of a tree, and
   d. means for actuating said means for selectively opening and closing said bottoms of said tubes for opening said bottoms and allowing fruit harvested by said tubes to pass through said tubes.

2. Apparatus as recited in claim 1 wherein said means for operatively connecting said supporting plate to said tube assemblies includes pipe connecting means including at least two pipe sections operatively connected by a swivel joint for each tube assembly.

3. Apparatus as recited in claim 2 wherein said actuating means includes a cable for each tube assembly extending through said corresponding pipe sections, and a movable second plate spaced vertically from and above said supporting plate having each of said cables rigidly attached thereto, vertical movement of said second plate away from said supporting plate resulting in opening of said bottom means.

4. Apparatus as recited in claim 1 wherein said members of said bottom means for each tube assembly are two identical curved members each pivoted to the inside surface of said tube, said members in the normal position thereof engaging each other along a surface to close the bottom of said tube and prevent passage of fruit there through, and in a second position thereof having said surfaces spaced from each other to open the bottom of said tube and allow passage of fruit contained therein there through.

5. Apparatus as recited in claim 4 wherein said means for actuating said means for selectively opening and closing said bottom means includes a lever for each of said curved members, each lever pivotally connected at one end thereof to a said curved member, and at the other end thereof to a vertically reciprocating rod, said rod connected to a cable and movable in response to movement of said cable, all said means being located interiorly of said tube.

6. Apparatus as recited in claim 5 wherein said actuating means further includes spring biasing means for biasing said curved members into said normal position thereof.

7. Apparatus as recited in claim 5 wherein said means for operatively connecting said tube assemblies to said supporting plate includes pipe means including at least two pipe sections operatively connected by a swivel joint for each tube assembly, and wherein said actuating means further includes a movable second plate spaced vertically from and above said supporting plate, each of said cables for said actuating means connected from said rod through said pipe sections to said second plate, vertical movement of said second plate away from said supporting plate resulting in opening of said means for selectively opening and closing the bottom of said tube.

8. Apparatus as recited in claim 1 wherein each of said tubular body portions is large enough to hold more than one piece of fruit.

9. Apparatus as recited in claim 1 wherein said tubular body portions of said harvesting tube assemblies are arranged in a crown fashion, the harvesting tube assemblies tubular body portions disposed generally around the periphery of said supporting plate being generally vertically spaced further from said supporting plate than the harvesting tube assemblies tubular body portions disposed generally near the center of said supporting plate.

10. Fruit harvesting apparatus adapted to be connected to a movable vehicle, said apparatus comprising:
   a. a plurality of fruit harvesting tube assemblies,
   b. a supporting plate having one surface thereof adapted to receive means for connecting said plurality of harvesting tube assemblies to said supporting plate,
   c. means for operatively connecting said plurality of tube assemblies to said supporting plate,
   d. means for selectively causing said tube assemblies to release fruit harvested thereby, and
   e. means for allowing said apparatus to harvest fruit from trees located on sloped ground and for allowing said apparatus to harvest fruit from more than one tree without movement of said movable vehicle which said apparatus is adapted to be connected to, said means including supporting means for supporting said apparatus by operatively connecting said supporting plate to a crane boom for raising and lowering said apparatus from and into trees, said supporting means comprising a plurality of pins rigidly attached to said supporting plate on the surface thereof opposite said one surface, said pins adapted to be connected to cables, which in turn are adapted to be connected to said crane boom.

11. Apparatus as recited in claim 10 wherein said means for selectively causing said tube assemblies to release fruit harvested thereby includes a second plate spaced vertically from and above said supporting plate, said second plate movable vertically with respect to said supporting plate.

12. Apparatus as recited in claim 11 wherein said supporting means for supporting said apparatus by operatively connecting said supporting plate to a crane boom also is a means for guiding the movement of said second plate with respect to said first plate.

13. Apparatus as recited in claim 11 wherein said second plate has pins mounted on the surface thereof spaced furthest from said supporting plate, said pins adapted to be connected to cables which in turn are adapted to be connected to means associated with said crane boom for moving said second plate with respect to said supporting plate.

14. Apparatus as recited in claim 10 wherein each of said tube assemblies includes a tubular body portion, an open top having a sloping surface, and means for severing the stems of fruit received by said open top, and wherein said means for selectively causing said tube assemblies to release fruit harvested thereby includes means for each of said tubes for selectively either opening or closing the bottom of said tubular body portion, said bottom means including members having sloped surfaces exterior of said tubular body portion and wherein said means for operatively connecting said plurality of tube assemblies to said supporting plate includes means for each tube assembly for allowing movement of said tube assembly out of interfering relationship with any tree limbs that it might engage during lowering and raising of said tube.

15. Apparatus as recited in claim 14 wherein each of said tubular body portions is large enough to hold more than one piece of fruit.

* * * * *